United States Patent [19]

Mole

[11] 4,020,826
[45] May 3, 1977

[54] SOLAR ENERGY SYSTEM
[76] Inventor: Robert Alan Mole, 230 39th St., Boulder, Colo. 80303
[22] Filed: Feb. 23, 1976
[21] Appl. No.: 660,087
[52] U.S. Cl. ............................. 126/270; 160/330
[51] Int. Cl.² ........................................ F24J 3/02
[58] Field of Search .......... 126/270, 271; 160/124, 160/238, 240, 330

[56] References Cited
UNITED STATES PATENTS

| | | | |
|---|---|---|---|
| 2,599,141 | 6/1952 | Taylor | 126/270 |
| 2,774,421 | 12/1956 | Lion | 160/238 |
| 2,859,810 | 11/1958 | Sachs | 160/124 |
| 3,288,206 | 11/1966 | Beeler | 126/270 |
| 3,857,432 | 12/1974 | Russell | 160/124 |

OTHER PUBLICATIONS

N. Fuschillo, "Semi-Transparent Solar Collector Window System," Pergamon Press., England, 1975, vol. 17, pp. 159–165.

Primary Examiner—Kenneth W. Sprague
Assistant Examiner—James C. Yeung
Attorney, Agent, or Firm—O'Rourke, Harris & Hill

[57] ABSTRACT

A solar energy system for selectively absorbing or reflecting radiant energy entering through a window of a structure, the system comprising a window drape having a decorative side and a back side, and a removable liner adjacent the backside of the window drape. At least one side of the liner or window drape backside is a radiant energy reflecting surface and another of said sides is a radiant energy absorbing surface. Thus, depending upon the season of the year, the system may be arranged to selectively provide the appropriate surface to optimize or minimize the radiant energy maintained within the structure.

9 Claims, 2 Drawing Figures

U.S. Patent  May 3, 1977  4,020,826
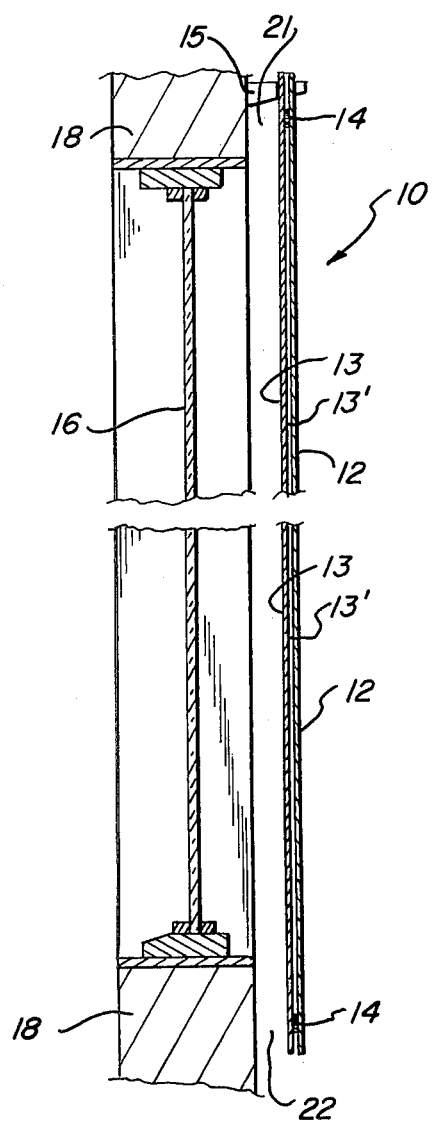
Fig_1
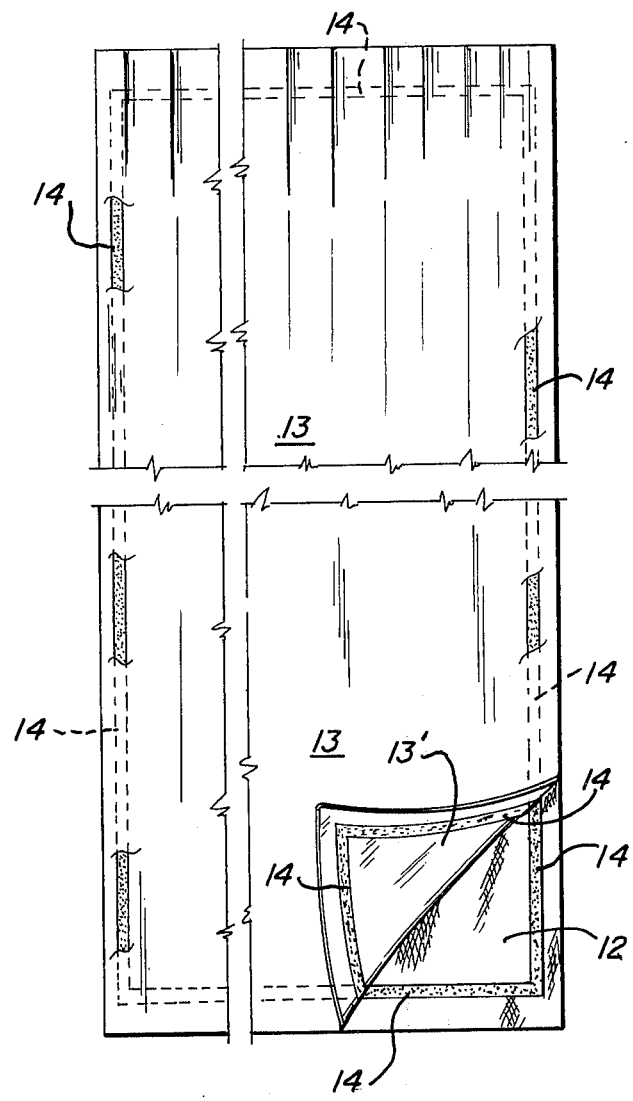
Fig_2

SOLAR ENERGY SYSTEM

BACKGROUND OF THE INVENTION

1. Field of the Invention

The present invention relates generally to solar energy systems, and more particularly to a window drapery arrangement which permits selective optimization or minimizing of radiant energy absorption by presenting an appropriate absorbing or reflecting surface to the radiant energy.

2. Description of the Prior Art

Window drapes per se are of course well known. Generally, the energy conserving merit of window drapes in limiting heat losses in a structure is well known. Basically, window drapes serve to provide an insulating barrier adjacent the usually thermally conductive window. However, the energy absorbing characteristics of drapes are generally ignored, or, in instances where is is considered, liners are generally provided which are reflective of solar energy to minimize the heat load within the structure in warm weather.

Certain prior art window hangings have been designed with concern for the varying requirements for selectively absorbing the radiant energy. For instance, venetian blinds having dark coatings on one side and light coatings on the other side are known. However, these have substantial drawbacks in that the interior coloring is thus determined by the desired exterior surface. Further, venetian blinds are inferior as insulating coverings and, as a result of the segmented construction, rather ineffective to induce convection heat flow. In the instance in which cooling is desired and a reflective surface is directed towards the radiant energy, a highly effective radiation emitting surface is directed towards the interior of the room thus compromising the effectiveness of the structure as a heat barrier.

SUMMARY OF THE INVENTION

The present invention, which provides a heretofore unavailable improvement over previous window hangings, comprises a drapery having the desired decorative interior appearance on one side which is supported in a conventional manner and presents the desired interior appearance. Adjacent the backside of the drapery, a liner is provided which may be readily removed and replaced. Either one side of the liner or the backside of the drape is provided with one of a radiant energy absorbing or radiant energy reflecting surface. One of the remaining two sides is then provided with the other of the radiant energy absorbing or radiant energy reflecting surface. Accordingly, without changing the interior appearance of the window hanging, radiant energy may be selectively maintained within the structure or reflected out of the structure through the window.

Accordingly, an object of this invention is to provide a new and improved solar energy system for optimizing the radiant energy heat load within a structure under varying climatic conditions.

Another object of the instant invention is to provide a new and improved window hanging which provides a functional solar energy system while maintaining a constant, pleasing appearance within the structure.

Yet another object of the instant invention is to provide a new and improved solar energy system which serves as a thermal barrier while providng for convection in the heating mode.

These and other objects and features of the present invention will become apparent from the following description.

BRIEF DESCRIPTION OF THE DRAWING

In the Drawing

FIG. 1 is a side view in cross section of a solar energy system window hanging positioned adjacent a window in accordance with the present invention; and FIG. 2 is a rear view of the window hanging of FIG. 1.

DETAILED DESCRIPTION OF THE INVENTION

Turning now to the drawings, wherein like components are designated by like reference numerals throughout the various figures, a solar energy system is shown in FIGS. 1 and 2 and generally designated by the numeral 10. In the preferred embodiment, drapery 12 and liner 13, secured together by fastening means 14, are supported by conventional hanger 15 adjacent window 16. At least one side of liner 13 is either a radiant energy reflecting surface or radiant energy absorbing surface. Either the other side of liner 13 or the backside of drapery 12 is the other of the radiant energy reflecting surface or radiant energy absorbing surface.

Preferably, as shown in FIG. 2, the exposed side of liner 13 is a radiant energy reflecting surface and the backside 13' of liner 13 is the radiant energy absorbing surface. In this manner, both the liner 13 and drapery 12 are always maintained adjacent window 16. In warm weather, the energy reflecting surface of liner 13 is disposed towards window 16 and radiant energy passing through window 16 is reflected through window 16. The double layer of liner 13 and drapery 12 serves to insulate against convection flow of heat absorbed by energy reflecting surface of liner 13.

Conversely, on cold days, the radiant energy absorbing surface of either liner 13 or drapery 12 is exposed towards window 16. Thus, the radiant energy is absorbed, the surface heated and the adjacent air between drapery 12 and window 16 accordingly heated. In this manner, warmed air is flowed by convection between structure wall 18 and drapery 12 through upper opening 21. Cooled air flows through lower opening 22, defined between wall 18 and drapery 12, to be heated by absorbed radiant energy.

Fastening means 14 may be in the form of snaps, zippers, or, for instance, Velcro interlocking material. Optionally, fastening means 14 need not be positioned on drapes 12 and liner 13, but may be provided for by hanger 15 which positions drapery 12 and liner 13 adjacent one another.

For purposes of discussion of solar energy system 10, a radiant energy absorbing surface is one that absorbs at least 75 percent of solar radiant energy falling thereon. On the other hand, a radiant energy reflecting surface is defined as one which reflects at least 75 percent of the solar radiant energy falling thereon. Preferably, the surfaces absorb or reflect at least 90 percent of the radiant energy falling thereon but worthwhile results are obtainable with the lower performance. Generally, white material will reflect 90 percent of the energy falling thereon and a deep black will absorb 95 percent of the energy falling thereon. For esthetic purposes, it is acceptable to provide a radiant energy absorbing system in the form of, for instance, a dark background with a yellow or other light color polka dot pattern therein. Such a pleasant pattern can absorb as much as 88 percent of the energy falling thereon.

EXAMPLE I

A black lined drapery was positioned adjacent a window. On a 44° F, sunny day with an ambient interior room temperature adjacent the room ceiling of 78° F, a substantial movement of air through the space at the top of the drape could be perceived. This air was measured at 104° F.

EXAMPLE II

A white lined drapery was positioned adjacent a window. On a 44° F, sunny day with an ambient interior room temperature adjacent the ceiling of 78° F, very little movement of air through the space at the top of the drape could be perceived. The temperature was measured at 88° F.

Summarily, the solar energy system of the instant invention provides an effective, economical and convenient control for utilizing solar energy within a structure. In the summertime, the energy can be effectively reflected back through windows thereby substantially decreasing the heat load within a structure. In the wintertime, the energy can be absorbed, employed to heat air adjacent the absorbing surface, and thus utilized to aid in heating the interior of the structure. This can be accomplished by merely removing or reversing a drapery liner.

In essence, the results are provided, in most instances, without requiring additional material as most draperies are lined in any event. Merely by properly chosing the color of the liner or backside of the drapery, and providing for convenient fastening or hanging means, a solar energy system for controlling the radiant energy passing through windows of a structure is provided.

Although only limited embodiments of the present invention have been illustrated and described, it is anticipated that various changes and modifications will be apparent to those skilled in the art, and that such changes may be made without departing from the scope of the invention as defined by the following claims.

What is claimed is:

1. A solar energy absorption control system comprising:
   pliant window drapes having a decorative side and a back side;
   a pliant drape liner having first and second sides;
   fastening means releasably attaching the drape liner to the backside of the window drapes;
   the backside of the drapes and the first and second sides of the liner comprising at least one radiant energy reflecting surface and at least one radiant energy absorbing surface;
   whereby the decorative side of the drapes may be positioned adjacent a window facing into the interior of the structure and, depending upon the season, the radiant energy reflecting surface positioned to reflect radiant energy back through the window or, alternatively, the radiant energy absorbing surface positioned to absorb the radiant energy and provide heat energy to the interior of the structure.

2. A solar energy system as set forth in claim 1 in which the backside of the drape is the radiant energy reflecting surface and the first side of the drape liner is the radiant energy absorbing surface;
   whereby the drape liner may be removed in warm weather to reflect the energy and the drape liner positioned to absorb the energy in cooler weather.

3. A solar energy system as set forth in claim 1 in which the backside of the drapes is the radiant energy absorbing surface and the first side of the drape liner is the radiant energy reflective surface;
   whereby the drape liner may be removed in cold weather to absorb the energy and the drape liner positioned to reflect the energy in warmer weather.

4. A solar energy system as set forth in claim 1 in which the first side of the drape liner is the radiant energy reflective surface and the second side of the liner is the radiant energy absorbing surface whereby the first side of the liner may be positioned facing away from the backside of the drapes when it is desired to minimize the radiant energy absorbed and the second surface is positioned facing away from the backside of the drapes when desired to maximize the radiant energy absorbed and maintained within the interior of a structure.

5. A solar energy system as set forth in claim 1 in which the fastening means comprise drape hangers adjacent an upper edge of the drape hanger.

6. A solar energy system as set forth in claim 1 in which the fastening means comprise complementary snaps on the backside of the window drapes and on the drape liner.

7. A solar energy system as set forth in claim 1 in which the fastening means are Velcro fasteners.

8. A solar energy system as set forth in claim 1 in which the radiant energy absorbing surface is substantially black.

9. A solar energy system as set forth in claim 1 in which the radiant energy reflecting surface is substantially white.

* * * * *